Aug. 26, 1947.  S. LANKHEET  2,426,359
BORING BAR
Filed June 24, 1944

INVENTOR.
Sander Lankheet
BY
Parker & Burton
Attorneys

Patented Aug. 26, 1947

2,426,359

UNITED STATES PATENT OFFICE 2,426,359

BORING BAR

Sander Lankheet, Lansing, Mich.

Application June 24, 1944, Serial No. 541,912

1 Claim. (Cl. 77—58)

This invention relates to improvements in boring bars.

An object is to provide a boring bar so constructed that any tendency of the bar to vibrate during working rotation is damped out or minimized.

Boring bars, and particularly those provided with relatively long shanks, frequently have a tendency under working rotation to vibrate and chatter. Such vibration and chatter disturbs the true rotation of the bar and interferes with the accurate cutting operation of the cutter carried by the bar.

The object of this invention is to provide a boring bar so constructed that any such tendency to vibrate will be damped out or substantially minimized.

This improved boring bar is simple, cheap and usable wherever boring bars are desired for use.

Other objects, advantages and meritorious features of my improved boring bar will more fully appear from the following description, appended claim and accompanying drawing, wherein:

Boring bars provided at one end with a cutter frequently have shanks of substantial length in order to carry out the required boring operation. Such a bar under certain conditions of working rotation may set up a vibration period which will produce chatter and injure the work. My invention is designed to prevent or substantially minimize any such tendency.

Figure 1:
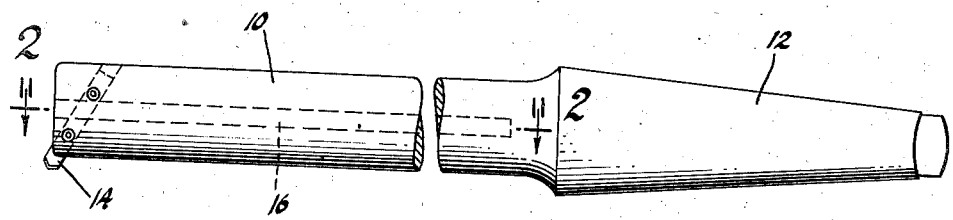
Fig. 1 is an elevation of a boring bar embodying this invention.
Figure 2:
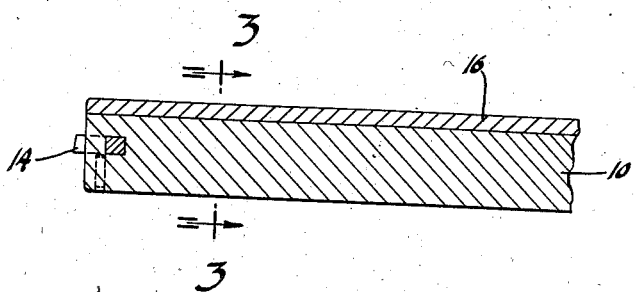
Fig. 2 is a sectional view taken on the line 2—2 of Fig. 1.
Figure 3:
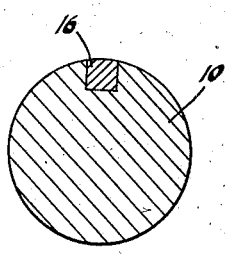
Fig. 3 is a sectional view taken on the line 3—3 of Fig 2.

In the drawing, and particularly in Fig. 1, a boring bar is illustrated which bar has a relatively long shank 10 shaped at one end as at 12 to be gripped by a chuck or other holding device to be rotated thereby. The opposite end of the shank is provided with a support for a cutter 14, which support is in the form of a way to receive the cutter, which cutter is held down by a clamping piece that may be secured by set screws or the like to the bar. So far this construction is conventional.

This invention consists of embedding in the shank of such a bar, a vibration damping insert 16, which insert is formed of material having a different vibration characteristic as compared with the material of which the bar is composed. The bar is preferably provided with a groove or channel extending lengthwise of its shank and within this channel the vibration damping material 16 is embedded as illustrated.

Boring bars are commonly formed of ferrous metal, such as an alloy steel. The conventional bar of this character, under certain conditions, may vibrate and chatter and the cutter may tend to repeat its revolution about the work by traveling through an old cut and thereby injure the work. The vibration and chatter which is set up in such a bar is detrimental to successful boring operations. I provide an insert 16 which may be formed of lead, solder, copper or some other suitable material which has a substantially different vibration characteristic from that of the material of the bar and which will tend to damp out the vibration or chatter of the bar and permit the bar to rotate true and without vibration or chatter.

I claim:

In a boring bar adapted to be supported for rotation about its longitudinal axis and having a relatively long cylindrical shank provided at one end with a cutter member, said shank provided with a groove extending substantially throughout the length thereof parallel to the axis of the shank, said groove being filled with vibration damping material.

SANDER LANKHEET.

REFERENCES CITED

The following references are of record in the file of this patent:

UNITED STATES PATENTS

| Number | Name | Date |
|---|---|---|
| 653,165 | Bedford et al. | July 3, 1900 |
| 1,625,030 | Keller | Apr. 19, 1927 |
| 2,187,772 | Dally | Jan. 23, 1940 |
| 2,224,386 | Guild | Dec. 10, 1940 |